United States Patent
Kocurek et al.

(10) Patent No.: US 9,617,818 B2
(45) Date of Patent: Apr. 11, 2017

(54) SEAL HAVING STRESS CONTROL GROOVE

(71) Applicant: ONESUBSEA IP UK LIMITED, London, England (GB)

(72) Inventors: Christopher George Kocurek, Houston, TX (US); Brandon Carringer, Houston, TX (US)

(73) Assignee: OneSubsea IP UK Limited, London (GB)

(*) Notice: Subject to any disclaimer, the term of this patent is extended or adjusted under 35 U.S.C. 154(b) by 369 days.

(21) Appl. No.: 14/223,889

(22) Filed: Mar. 24, 2014

(65) Prior Publication Data
US 2014/0203516 A1    Jul. 24, 2014

Related U.S. Application Data

(63) Continuation-in-part of application No. 13/127,034, filed on Apr. 29, 2011, now Pat. No. 8,800,648.
(Continued)

(51) Int. Cl.
*E21B 33/03* (2006.01)
*F16J 15/16* (2006.01)
(Continued)

(52) U.S. Cl.
CPC .............. *E21B 33/03* (2013.01); *E21B 33/04* (2013.01); *F16J 15/16* (2013.01); *F16J 15/166* (2013.01); *F16L 21/03* (2013.01); *F16L 21/035* (2013.01)

(58) Field of Classification Search
CPC . F16J 15/16; F16J 15/166; F16L 21/03; F16L 21/035
See application file for complete search history.

(56) References Cited

U.S. PATENT DOCUMENTS

| 3,007,723 A | 11/1961 | Clarke |
| 3,288,475 A | 11/1966 | Benoit |

(Continued)

FOREIGN PATENT DOCUMENTS

| EP | 0334389 A2 | 9/1989 |
| FR | 2704042    | 10/1994 |

(Continued)

OTHER PUBLICATIONS

PCT Search Report and Written Opinion for PCT/US2010/020679 mailed Apr. 22, 2010.
(Continued)

*Primary Examiner* — Shane Bomar
(74) *Attorney, Agent, or Firm* — Fletcher Yoder P.C.

(57) ABSTRACT

A system, including an inner body, an outer body disposed about the inner body, and a grooved seal, wherein the grooved seal includes a sealing face and first and second side faces, wherein the first side face includes a first groove, the second side face includes a second groove, and the sealing face includes a third groove, wherein one of the inner body or the outer body includes an annular channel, and the grooved seal is disposed in the annular channel to seal an annular space between the inner body and outer body, wherein the sealing face seals against one of the inner body or the outer body, the first side face having the first groove seals against a first sidewall of the annular channel, and the second side face having the second groove seals against a second sidewall of the annular channel.

27 Claims, 12 Drawing Sheets

Related U.S. Application Data which is a continuation-in-part of application No. 13/212,780, filed on Aug. 18, 2011.

(51) Int. Cl.
*E21B 33/04* (2006.01)
*F16L 21/03* (2006.01)
*F16L 21/035* (2006.01)

(56) References Cited

U.S. PATENT DOCUMENTS

| | | | |
|---|---|---|---|
| 3,454,088 | A | 7/1969 | Johnson et al. |
| 3,940,155 | A | 2/1976 | Baumle |
| 5,096,209 | A | 3/1992 | Ross |
| 5,180,008 | A | 1/1993 | Aldridge et al. |
| 5,303,935 | A * | 4/1994 | Saksun .............. F16J 15/3224 277/567 |
| 5,330,201 | A | 7/1994 | Hart |
| 5,791,657 | A | 8/1998 | Cain et al. |
| 5,873,576 | A | 2/1999 | Dietle et al. |
| 6,173,964 | B1 | 1/2001 | Bell et al. |
| 6,565,093 | B2 | 5/2003 | Crow et al. |
| 7,976,075 | B2 | 7/2011 | Smith, III et al. |
| 8,201,832 | B2 | 6/2012 | Kocurek |
| 2002/0084593 | A1 | 7/2002 | Baehl et al. |
| 2002/0121743 | A1 * | 9/2002 | Crow .................. E21B 33/1208 277/343 |
| 2007/0029080 | A1 | 2/2007 | Moyes |
| 2010/0181729 | A1 | 7/2010 | Slay et al. |
| 2010/0194049 | A1 | 8/2010 | Kocurek |
| 2010/0206588 | A1 | 8/2010 | Nguyen |
| 2011/0266752 | A1 | 11/2011 | Kocurek et al. |
| 2012/0205873 | A1 | 8/2012 | Turley |
| 2012/0227957 | A1 | 9/2012 | Xu et al. |
| 2012/0298376 | A1 | 11/2012 | Twardowski |

FOREIGN PATENT DOCUMENTS

| | | |
|---|---|---|
| GB | 1224219 | 3/1971 |
| WO | 2010083132 A1 | 7/2010 |

OTHER PUBLICATIONS

Bauer et al.; "Dichtungen fur die Fluidtechnik"; Jan. 1, 1993; Dichtungen Fuer Die Fluidtechnik, Mainz; Vereinigte Fachverl, pp. 154-162; XP002507429; ISBN: 9783783002768; figures 1.7.22b, 1.7.22f, g.

PCT International Preliminary Report on Patentability for PCT/US2010/020679, mailed on Jul. 28, 2011.

Parker Hannifin Corporation, Engineered Polymer Systems Division, "S-Seal Profile for HTHP Sealing," Technical Bulletin, No. 5277B1/USA, Salt Lake City, UT, 2005, 4 pages.

Parker Hannifin Corporation, Engineered Polymer Systems Division, "S-Seal Profile for HTHP Sealing," Technical Bulletin, No. 5277B1/USA, Salt Lake City, UT, 2006, 4 pages.

PCT International Search Report and Written Opinion for PCT/US2012/050782, dated Feb. 1, 2013.

* cited by examiner

SEAL HAVING STRESS CONTROL GROOVE

CROSS REFERENCE TO RELATED APPLICATION

This application claims priority to and benefit of U.S. patent application Ser. No. 13/127,034, entitled "SEAL HAVING STRESS CONTROL GROOVE," filed Apr. 29, 2011, which is herein incorporated by reference in its entirety, and U.S. patent application Ser. No. 13/212,780, entitled "S-SEAL," filed on Aug. 18, 2011, which is herein incorporated by reference in its entirety.

FIELD OF THE INVENTION

This present invention relates to seals within a fluid system. More particularly, the present invention relates to grooved seals suitable for use in the harsh environments encountered by mineral extraction systems, for example.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as mineral (e.g., oil and gas) extraction systems and transport systems, typically include multiple segments of tubing, valves, and connectors that are sealed together by various seals. These seals are often subjected to harsh environmental conditions, such as exposure to corrosive fluids, extreme pressures, and extreme temperatures. Moreover, seals are often disposed in remote equipment, such as a marine (e.g., sub-sea) wellhead, which can make access and repair of the seal difficult and expensive. In mineral extraction applications, seals are often constructed of elastomers or rubbers. These seals frequently experience large temperature variances. Over time, due primarily to this temperature gradient, these seals are damaged in that they tend to lose their memory or shape. When this type of damage occurs, the seals are less effective at high pressures and sub-ambient temperatures.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
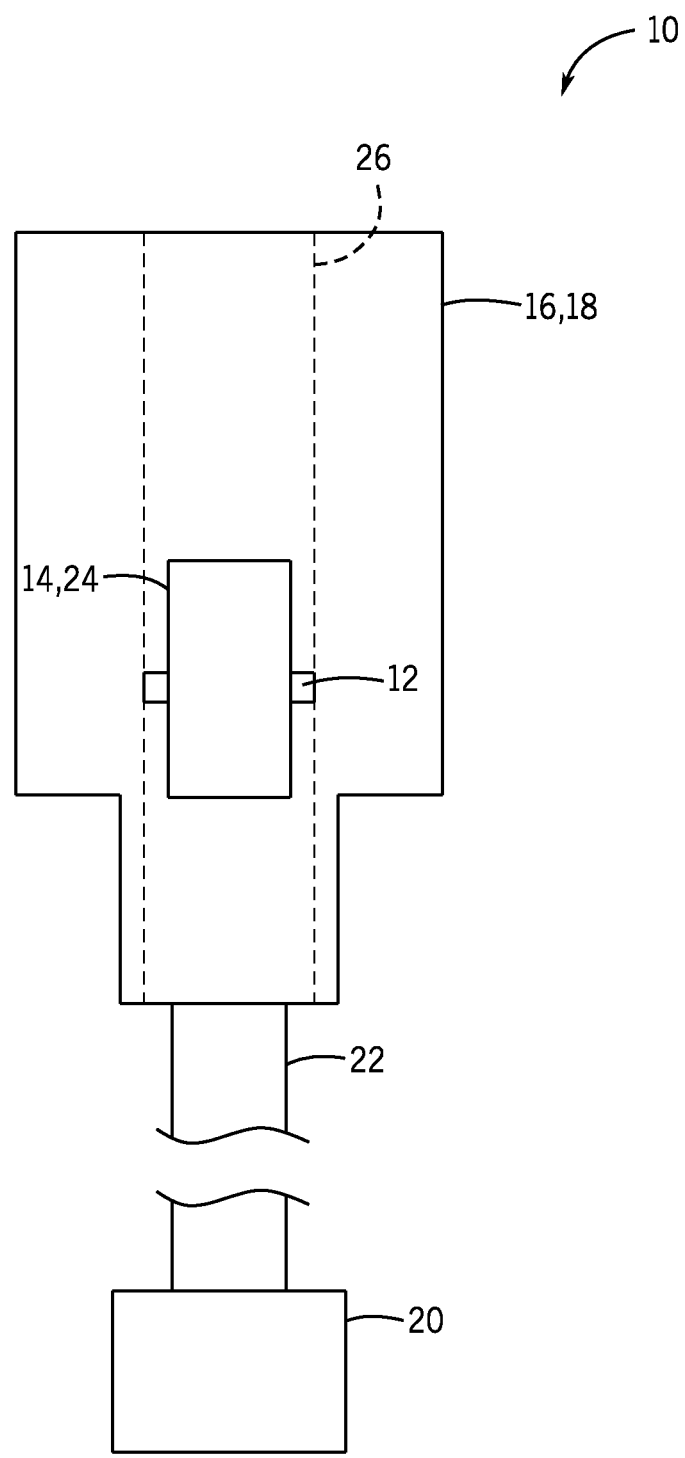
FIG. 1 is a block diagram of a seal disposed in a fluid system.

FIG. 1 is a partial cross-sectional view of an embodiment of a fluid hydrocarbon extraction system 10 having one or more grooved seals 12 (e.g., S-seal) between an inner body 14 and an outer body 16. The hydrocarbon extraction system 10 enables extraction of subterranean natural resources, such as oil and gas. For example, in the illustrated embodiment, the outer body 16 includes a wellhead 18 coupled to a mineral deposit 20 via a well 22. The inner body 14 includes a hanger 24 disposed in a wellhead bore 26 and supported by the wellhead 18, for example. In the case of mineral extraction systems, the inner body 14 and the outer body 16 may include or be coupled to any number of components, such as Christmas trees, casing hangers, casing heads, casing strings, tubing hangers, tubing heads, tubing strings, running tools, blowout preventers, valves, flanges, and so forth. In mineral extraction and similar systems, the grooved seal 12 may be used with working pressures up to 20,000 pounds per square inch (psi) or greater. In certain embodiments, the grooved seal 12 may be used to isolate regions of gases or fluids with pressure differentials across the grooved seal 12 of 15,000 psi or greater. Further, the operating environment of such systems may include temperatures ranging from −50° F. to 450° F.

Certain exemplary grooved seal embodiments described herein include systems and methods which address one or more of the above-mentioned challenges of operating a grooved seal 12 in harsh sub-sea environmental conditions, such as exposure to corrosive fluids, extreme pressures, and extreme temperatures. As explained in detail below, the disclosed embodiments include a grooved seal 12 having a cross-section which includes grooves on inner and/or outer faces of the seal, which contact the inner or outer bodies 14, 16 to form fluid seals. The grooves may function to create higher contact stresses near the grooves and may force the material used for the body of the grooved seal 12 to slightly deform into a cavity formed by the groove, and conforming to surface and irregularities of inner and outer bodies 14, 16; thereby more effectively sealing between the inner and outer bodies 14, 16 and the grooved seal 12.

In addition, the grooved seal 12 embodiments described herein may be capable of operation across a broader spectrum of temperatures and pressures. As described above, the environments within which sub-sea seals operate are frequently transitioned between hot and cold temperature cycles. Tests have shown that typical sub-sea seals are generally only capable of maintaining 12,500 psi while cycling between approximately 35° F. and approximately 285° F. However, tests have shown that the grooved seals 12 described herein may be capable of maintaining 15,000 psi while cycling between approximately 20° F. and approximately 375° F. Therefore, the grooved seal 12 embodiments described herein may maintain greater pressure than typical seals across a wider range of temperatures than typical seals. In addition, it is estimated that the grooved seal embodiments described herein may be capable of maintaining 10,000 psi while cycling between approximately 10° F. and approximately 400° F. and maintaining 20,000 psi while cycling between approximately 35° F. and approximately 350° F.

Figure 2:
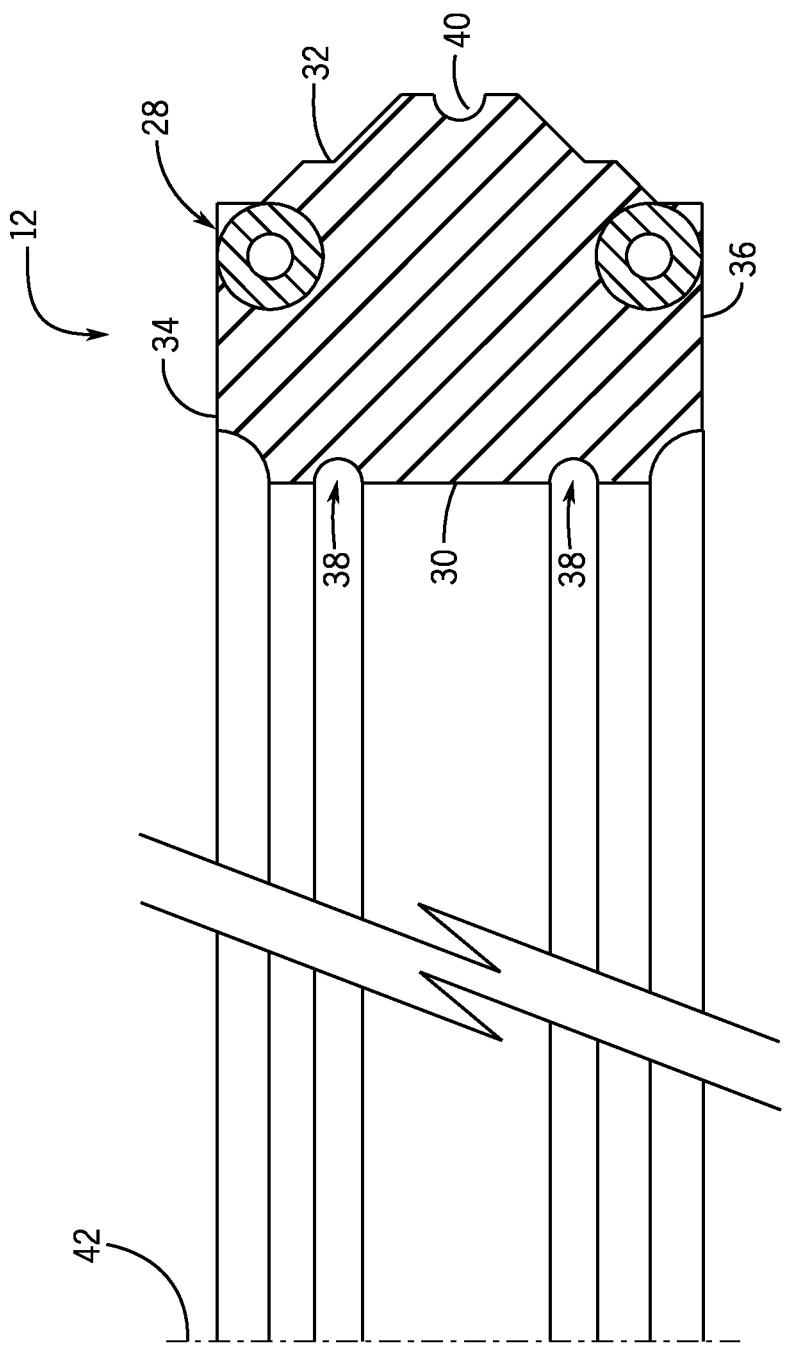
FIG. 2 is a partial cross-section of a grooved seal according to an embodiment.

FIG. 2 illustrates a cross-sectional view of an exemplary embodiment of the grooved seal 12. The illustrated embodiment includes the grooved seal 12 having an annular body 28, an inner face 30, an outer face 32, a first side face 34, a second side face 36, one or more inner grooves 38 on the inner face 30, one or more outer grooves 40 on the outer face 32, and a longitudinal axis 42. The body 28 of the annular (e.g., radial) grooved seal 12 includes a ring-like member centered about the longitudinal axis 42. The inner face 30 includes the innermost diameter of the body 28, which generally interfaces with (e.g., contacts) the inner body 14. The outer face 32 includes the face of the grooved seal 12 on the outermost diameter of the body 28, which generally interfaces with (e.g., contacts) the outer body 16. Accordingly, the inner face 30 and the outer face 32 may provide a fluid seal between the annular grooved seal 12 and the inner body 14 and the outer body 16, respectively.

In an annular seal configuration, the grooved seal 12 is generally set by a radial load, which compresses or expands the seal into contact with complementary sealing surfaces (e.g., the inner body 14 and the outer body 16). For example, the inner body 14 may include a section with a smaller diameter, a section with a larger diameter, and a tapered section between the two sections. As such, the inner body 14 may urge the grooved seal 12 onto the inner body 14 and over the tapered section from the small diameter section to the large diameter section. This may provide an axial load, which biases the grooved seal 12 outward and compresses the grooved seal 12 against the outer body 16. Similarly, a taper on the outer body 16 may provide a compressive load on a grooved seal 12 to generate an inward radial loading, which compresses the grooved seal 12 against the inner body 14.

In general, the first side face 34 and the second side face 36 generally do not seal with a complementary surface. However, in a packer arrangement, the first side face 34 and the second side face 36 may generally be used as locations to apply loads to seat, set, and/or lock the grooved seal 12 in place. In other words, the first side face 34 and the second side face 36 may experience axial loads to push the grooved seal 12 into position, to compress the grooved seal 12 such that it expands radially between the inner body 14 and the outer body 16, and to hold the grooved seal 12 in place. For example, a tool may be forced against the first side face 34 until the second side face 36 contacts a surface and/or another tool. Therefore, the first side face 34 may be loaded in a direction parallel to the longitudinal axis 42 to compress the grooved seal 12, causing the grooved seal 12 to expand radially. The radial expansion may cause the inner face 30 and the outer face 32 to bias against the inner body 14 and the outer body 16, respectively, forming a fluidic seal between the respective interfaces. Continuing to apply the axial force (e.g., locking the grooved seal 12) may maintain the radial expansion and, thus, maintain the fluid seal.

Figure 3A:
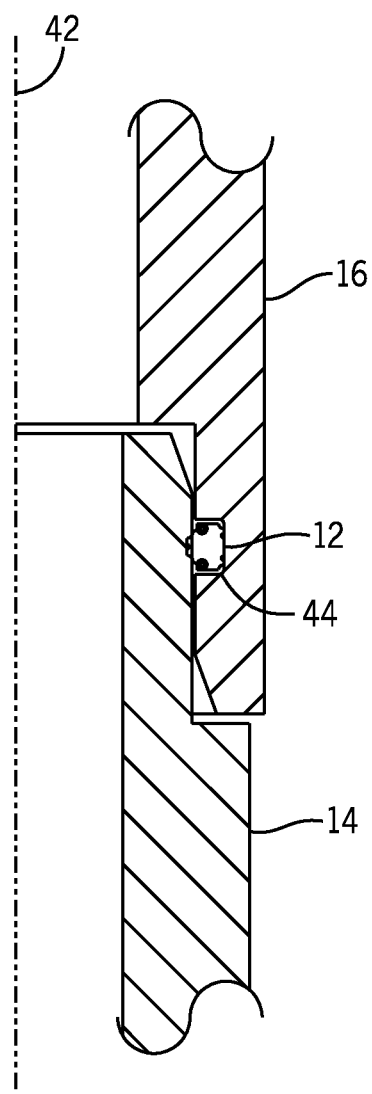
FIG. 3A is a cross-sectional view of a grooved seal in an outer body according to an embodiment.
Figure 3B:
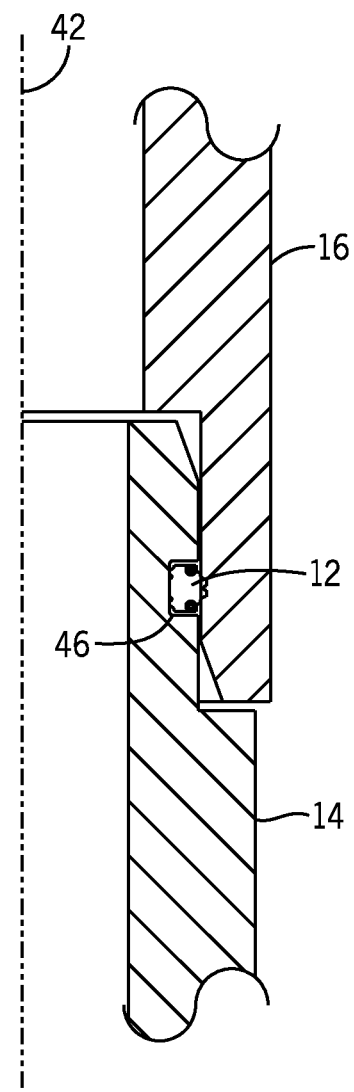
FIG. 3B is a cross-sectional view of a grooved seal in an inner body according to an embodiment.

The body 28 of the grooved seal 12 may be oriented in various configurations between the inner body 14 and the outer body 16. For example, FIGS. 3A and 3B are cross-sectional views of exemplary embodiments of an inner body 14 and an outer body 16, within which the grooved seal 12 may be oriented. For instance, in FIG. 3A, the grooved seal 12 is located within an outer body recess 44 of the outer body 16. In addition, as illustrated, the grooved seal 12 of FIG. 3A, illustrated as an S-seal, is oriented in such a way that the side of the grooved seal 12 that includes the anti-extrusion springs is closest to the innermost diameter of the grooved seal 12. Conversely, in FIG. 3B, the grooved seal 12 is located within an inner body recess 46 of the inner body 14. In addition, as illustrated, the grooved seal 12 of FIG. 3B, again illustrated as a S-seal, is oriented in such a way that the side of the grooved seal 12 which includes the anti-extrusion springs is the outermost diameter of the grooved seal 12. Therefore, the grooved seal 12 may be located within recesses of either the inner body 14 or the outer body 16 and may be oriented in various ways within these recesses. In other words, the location and orientation of the grooved seal 12 may vary.

Returning now to FIG. 2, the portion of the grooved seal 12 (e.g., the seal interface) that engages the complementary surfaces (e.g., the inner body 14 and the outer body 16) may include a variety of shapes and configurations. For example, the seal interface may include a continuous surface that is formed from one or more materials. In an embodiment wherein the complementary sealing surface generally conforms to the contour of the grooved seal 12 (e.g., a relatively flat surface), the sealing interface may include a single engagement portion that extends across a surface of the grooved seal 12. In an embodiment where the complementary surface includes a surface that does not conform to a surface of the grooved seal 12 (e.g., an interrupted surface), the seal interface may include one or more engagement portions at each location where the grooved seal 12 contacts the complementary surface. Further, the grooved seal 12 may include a plurality of interruptions along its sealing surface. For example, the grooved seal 12 may include one or more bumps, protrusions, indentations, recesses, or similar features. Accordingly, where the complementary surface does not conform to the contour of the grooved seal 12, the seal interface may include one or more engagement portions at each of the locations where the grooved seal 12 contacts the complementary surface. Further, each of the seal engagement portions may include the same or even different types of materials, depending on the composition and arrangement of the materials used to form the grooved seal 12.

The body 28 of the grooved seal 12 may be characterized as hard and/or soft by a variety of metrics. In one embodiment, the hardness of the body 28 may be characterized by the resistance to indentation, otherwise referred to as the materials Durometer (D) denoted in the Shore A scale. In another embodiment, the body 28 may be characterized as hard or soft based on its stiffness (e.g., glass transitions temperature). In a characterization including the Durometer, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A.

In certain embodiments, the body 28 of the grooved seal 12 includes a hydrogenated nitrile butadiene rubber (HNBR) having a Durometer of about 90 Shore A. In other embodiments, the body 28 includes a nitrile rubber (NBR) having a Durometer of about 70 Shore A. Further, certain embodiments may include the body 28 formed from a CAM-LAST™ or a DUROCAM™ material, manufactured by Cameron with headquarters in Houston, Tex. In addition, certain embodiments may include the body 28 formed from an Elast-O-Lion® material (e.g., Elast-O-Lion® 101 or Elast-O-Lion® 985), manufactured by the James Walker Group with headquarters in Cheshire, United Kingdom. In general, any other elastomer or rubber (e.g., Viton, EPDM, and so forth) suitable for use in sub-sea seal applications may be used for the body 28 of the grooved seal 12. In particular, rubbers and elastomers having a Durometer between 70 Shore A and 90 Shore A may be particularly well-suited. However, rubbers and elastomers having a Durometer between 60 Shore A and 100 Shore A may also be used. Other materials may include nitrile, polyether ether ketone (PEEK), thermoplastics, fluroelastomers, perfluroelastomers, perflurosilicons, etc. Selection of a particular elastomer may be based on the pressure, temperature, and chemical environment in which the grooved seal 12 operates.

Figures 4A, 4B:
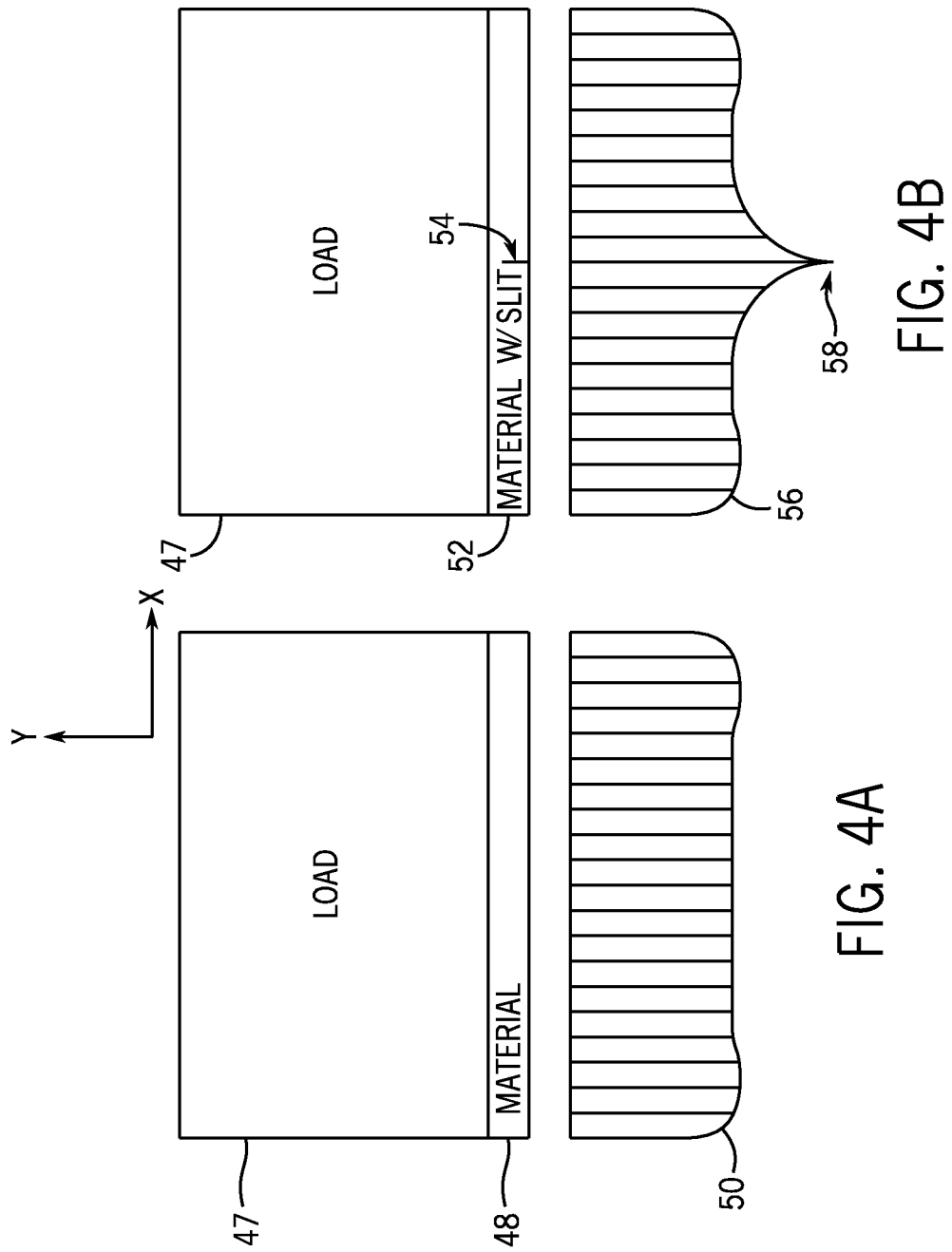
FIGS. 4A and 4B illustrate the loads and contact stress concentrations that may be exerted on exemplary embodiments of the grooved seal.

In order to more fully discuss the grooved seal 12 embodiments described herein, the mechanics underlying the grooved seal 12 embodiments will now be presented. In particular, FIGS. 4A and 4B illustrate the loads and contact stress concentrations that may be exerted on exemplary embodiments of the grooved seal 12. Specifically, FIG. 4A illustrates how a load 47 may be applied to a first sheet of material 48, such as rubber. For illustration purposes, the load 47 is depicted as a uniform load 47 applied to a uniform sheet of material 48. However, the mechanics presented herein may also generally apply to less uniform configurations. The load 47 is analogous to the type of load which may be exerted on, for instance, the inner face 30 of the grooved seal 12 from the inner body 14 of FIGS. 2, 3A, and 3B. However, the load 47 may also be analogous to the type of load which may be exerted on, for instance, the outer face 32 of the grooved seal 12 from the outer body 16 of FIGS. 2, 3A, and 3B. In the scenario where the load 47 is uniformly distributed across a uniformly-distributed sheet of material 48 (i.e., without grooves or protrusions), the contact stress concentration 50 across the first sheet of material 48 may also be relatively uniform. Indeed, the contact stress may be approximately equal to:

$$\sigma_{uniform} = \frac{F}{A}$$

where $\sigma_{uniform}$ is the contact stress, F is the force applied by the load 47, and A is the cross-sectional area of the first sheet of material 48, upon which the load 47 is applied.

Conversely, FIG. 4B illustrates the same load 47 applied to a second sheet of material 52. As with the first sheet of material 48, the second sheet of material 52 is also uniformly distributed. However, the second sheet of material 52 includes a slit 54 having an infinitesimal width. In this scenario, as illustrated, the contact stress concentration 56 across the second sheet of material 52 will not be uniform, despite the relatively uniform load 47 and uniform cross-section of the second sheet of material 52. Rather, the contact stress concentration 56 across the second sheet of material 52 will be greater at contact stress point 58, corresponding to the location of the slit 54 along the bottom face of the second sheet of material 52. Indeed, the contact stress at point 58 will be greater than $\sigma_{uniform}$, corresponding to the uniform contact stress concentration illustrated in FIG. 4A. However, it should be noted that the integral area of both of the contact stress concentration 50, 56 profiles will be the same for both sheets of material 48, 52.

In particular, the contact stress in the y-direction is greater at the slit 54 due, at least in part, to the fact that the second sheet of material 52 is not supported in the x-direction and the z-direction (e.g., into and out of the page) at the slit 54. In other words, the material that was resisting movement in both the x-direction and the z-direction in FIG. 4A is allowed to move, even if very slightly, in the x-direction and the z-direction in FIG. 4B. In addition, in the context of the grooved seal 12 embodiments, the material of the body 28 of the grooved seal 12 may slightly deform into the cavity formed by the grooves, further creating a tighter seal. These mechanics may prove beneficial in that higher contact stresses at points corresponding to the grooves may enable the grooved seal 12 to create tighter seals and to maintain the shape memory of the grooved seal 12 over a greater range of operating temperatures and pressures.

However, the mechanical stress in the body 52 at the slit 54 would approach an infinitely large value if the slit 54 had an infinitesimal width. Infinitely large stresses at individual points may counteract the beneficial mechanics described above. Therefore, as a practical matter, the slit 54 illustrated in FIG. 4B may be replaced by grooves having more pronounced cross-sectional areas, as described in greater detail below. Using grooves may considerably reduce the stresses as compared to those experienced by the slit of FIG. 4B while still allowing for the benefits described above. In addition, the use of grooves may reduce crack propagation, which would be more likely when using slits.

Therefore, embodiments of the grooved seal 12 include cross-sections having one or more grooves. In certain embodiments, the grooves may be located along the inner face 30 and/or the outer face 32 of the body 28 of the grooved seal 12. However, in other embodiments, the grooves may be located along the first side face 34 and/or the second side face 36 of the body 28 of the grooved seal 12. The grooves effectively create features, which are similar to the slit 54, that provide areas of increased contact stress to maintain a fluid seal between the grooved seal 12 and the internal and external bodies 14, 16. In particular, the point at which the grooves adjoin its respective face of the body 28 of the grooved seal 12 may experience increased contact stress. In addition, the overall contact area may be reduced between, for instance, the inner face 30 of the body 28 of the grooved seal 12 and the inner body 14, further increasing the contact stress. It should be noted that the grooves do not mate with any other mechanical features of the inner and outer bodies 14, 16, such as mating protrusions. Rather, a cavity is formed between each groove and the inner or outer body 14, 16 adjacent to the respective groove. Indeed, the material of the body 28 of the grooved seal 12 may slightly deform into the cavity formed by the grooves enabling the inner surface 30 and adjoining groove 38 to conform to the inner body 14.

Figure 5:
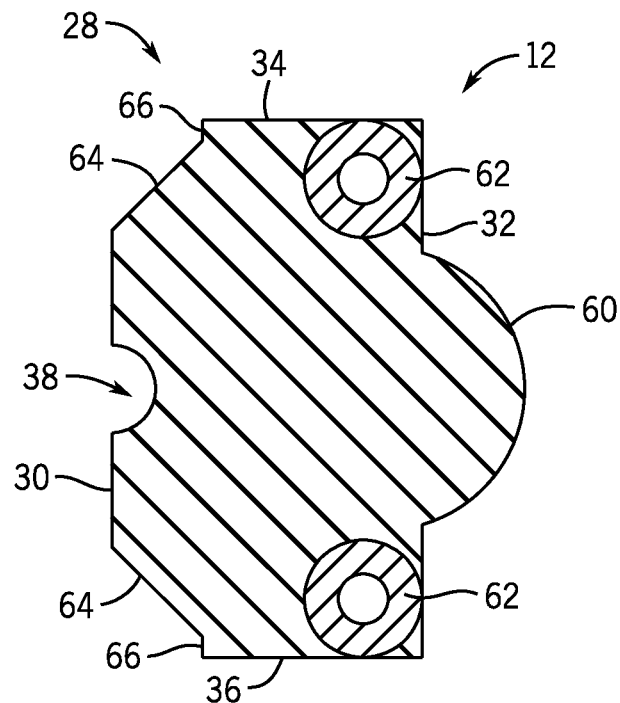
FIG. 5 is a partial cross-sectional view of a grooved seal with an inner groove on an inner face according to an embodiment.
Figure 6:
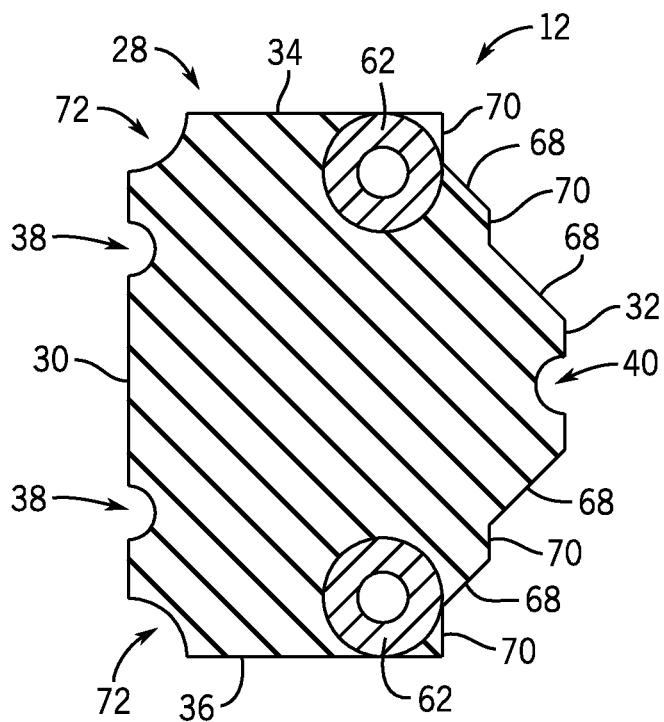
FIG. 6 is a partial cross-sectional view of a grooved seal with multiple inner grooves on an inner face and an outer groove on an outer face according to an embodiment.
Figure 7:
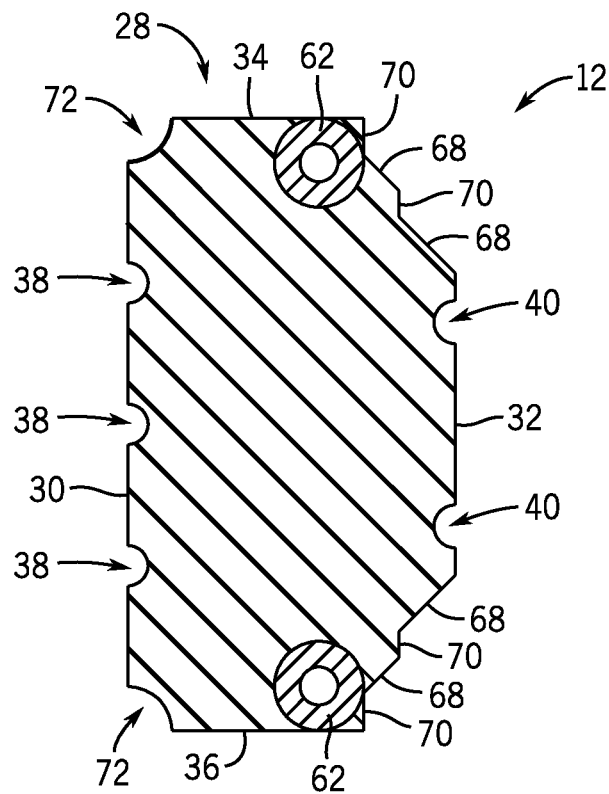
FIG. 7 is a partial cross-sectional view of a grooved seal with multiple inner grooves on an inner face and multiple outer grooves on an outer face according to an embodiment.

Turning now to FIGS. 5-7, various embodiments of the grooved seal 12 are illustrated as an S-seal. However, as described in greater detail below, embodiments of the grooved seal 12 may include other configurations and geometries. FIG. 5 is a partial cross-section of an exemplary embodiment of a grooved seal 12 with an inner groove 38 on its inner face 30. The grooved seal 12 includes a curved protrusion 60 from the outer face 32 of the body 28 of the grooved seal 12. The protrusion 60 may be the portion of the body 28 of the grooved seal 12 which contacts the outer body 16. The grooved seal 12 also includes integral anti-extrusion springs 62 near the corners of the outer face 32 of the body 28 of the grooved seal 12. The anti-extrusion springs 62 may, for instance, be made of metal, PEEK (polyetheretherketone), or other suitable hard materials.

In addition, the inner face 30 of the body 28 of the grooved seal 12 includes tapered notches 64 extending from the inner face 30 to lips 66, which adjoin the first side face 34 and the second side face 36 of the body 28 of the grooved seal 12, respectively. The tapered notches 64 may reduce the contact area between the body 28 of the grooved seal 12 and the inner body 14, with which the inner face 30 of the body 28 of the grooved seal 12 contact. Additionally, the inner face 30 of the body 28 of the grooved seal 12 includes an inner groove 38 which, as discussed in greater detail above, may help create higher contacts stresses along the inner face 30 as well as enable the body 28 of the grooved seal 12 to slightly deform into the cavity formed by the inner groove 38. As such, the effectiveness of the fluid sealing characteristics of the grooved seal 12 may be enhanced for a broader range of operating temperatures and pressures.

Although illustrated in FIG. 5 as a full-radius groove, the inner groove 38, and indeed all of the grooves described herein, need not be limited to a full-radius design. For instance, the grooves may be half-radius, rectangular, triangular, and so forth. In addition, in certain embodiments, the grooves may be wider, thinner, deeper, shallower, and so forth. Indeed, no particular groove cross-section is required. However, tests have shown that a full-radius groove, in many circumstances, may provide particularly good sealing performance across a broader range of temperatures.

In addition, it should be noted that an important consideration is that the grooves not be too wide or deep, since a general purpose of the grooves is to minimally interrupt the sealing surface while still utilizing the radial "spring" energy of the seal. In contrast, if the grooves are too wide or too deep, the amount of radial energy stored in the seal may decrease, thereby decreasing the effectiveness of the seal. As such, the grooves may generally be designed such that the width and depth of the grooves are only a fraction (e.g., 2%, 5%, 8%, 10%, and so forth) of the sealing surface within which the grooves are located.

In addition, tests have shown that another important design factor may be the use of 90° angles between the inner face 30 and the inner wall of the inner groove 38 (i.e., the inner wall of the inner groove 38 and the inner face 30 are perpendicular). Furthermore, tests have shown that the grooves may be most effective with radii of 0.020-inch. However, other radii values, such as 0.005-inch increments between 0.015-inch and 0.060-inch, may also be used. All of these considerations also hold true for grooves on the outer face 32 as well as for all of the grooves described herein.

FIG. 6 is a partial cross-section of an exemplary embodiment of a grooved seal 12 with multiple inner grooves 38 on its inner face 30 and an outer groove 40 on its outer face 32. Instead of the curved protrusion 60 illustrated in FIG. 5, the grooved seal 12 of FIG. 6 includes multiple tapered lead-ins 68 and associated lips 70 on the outer face 32 of the body 28 of the grooved seal 12. In addition, the outer face 32 of the body 28 of the grooved seal 12 includes the outer groove 40. The outer groove 40 may function similarly to the inner groove 38 of FIG. 5, creating higher contact stresses along the outer face 32 and allowing for the body 28 of the grooved seal 12 to slightly deform into the cavity formed by the outer groove 40.

Additionally, as opposed to the embodiment illustrated in FIG. 5, the inner face 30 of the body 28 of the grooved seal 12 of FIG. 6 includes multiple inner grooves 38. The use of multiple grooves 38 along the inner face 30 may be due to a larger contact area between the inner face 30 and the inner body 14. In other words, the multiple inner grooves 38 may generate multiple points of increased contact stress, as illustrated by point 58 in FIG. 4B. In addition, the inner face 30 of the body 28 of the grooved seal 12 of FIG. 6 includes curved notches 72, as opposed to the tapered notches 64 of FIG. 5, at the corners of the inner face 30 which adjoin the first side face 34 and the second side face 36 of the body 28 of the grooved seal 12, respectively. As with the tapered notches 64 of FIG. 5, the curved notches 72 of FIG. 6 may reduce the contact area between the body 28 of the grooved seal 12 and the inner body 14, with which the inner face 30 of the body 28 of the grooved seal 12 contacts.

FIG. 7 is a partial cross-section of an exemplary embodiment of a grooved seal 12 with multiple inner grooves 38 on its inner face 30 and multiple outer grooves 40 on its outer face 32. For the most part, the embodiment illustrated in FIG. 7 is very similar to the embodiment illustrated in FIG. 6. However, in this embodiment, both the inner face 30 and the outer face 32 include multiple grooves. Indeed, any number of grooves may be used on any number of faces of the body 28 of the grooved seal 12. In addition, the distance between multiples grooves on a particular face may vary. For instance, multiple grooves may be spaced ¼", ½", 1", 2", and so forth, apart from each other, depending on the specific configuration.

Figure 8:
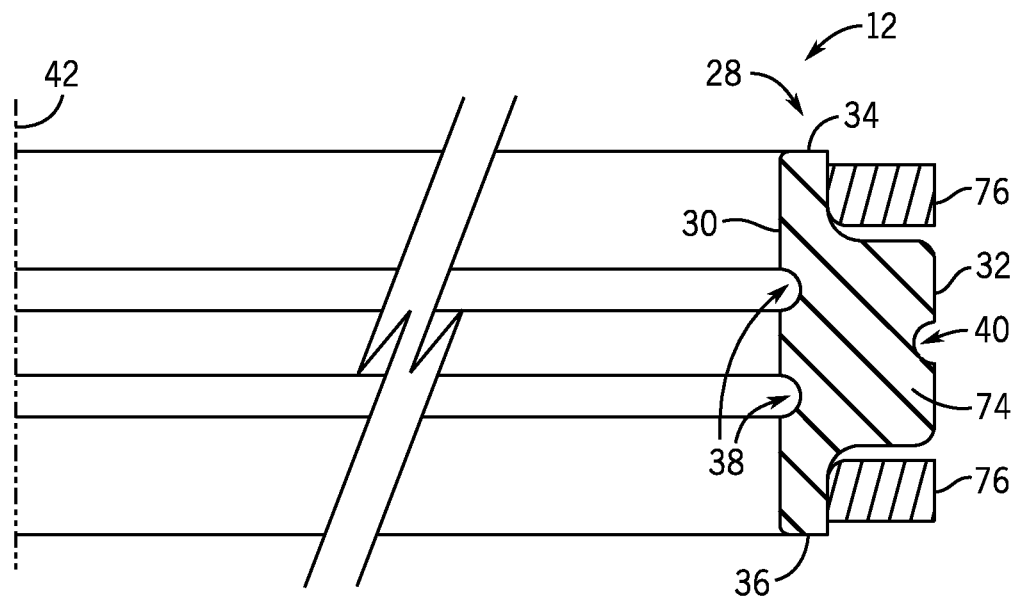
FIG. 8 is a partial cross-sectional view of a T-seal with multiple inner grooves on an inner face and an outer groove on an outer face according to an embodiment.

In addition to the embodiments of the grooved seal 12 illustrated in FIGS. 5-7, other embodiments include alternate configurations and geometries. For example, certain embodiments include T-seals, Metal-End-Cap seals, generic annular (e.g., radial) seals, face seals, and so forth. For example, FIG. 8 is a partial cross-section of an exemplary embodiment of a T-seal 12 with multiple inner grooves 38 on its inner face 30 and an outer groove 40 on its outer face 32. The T-seal 12 includes a protrusion 74 from the outer face 32 of the body 28 of the T-seal 12, and extrusion rings 76 disposed integral to the protrusion 74. The extrusion rings 76 may, for instance, be made of metal, PEEK, or other suitable hard materials.

Figure 9:
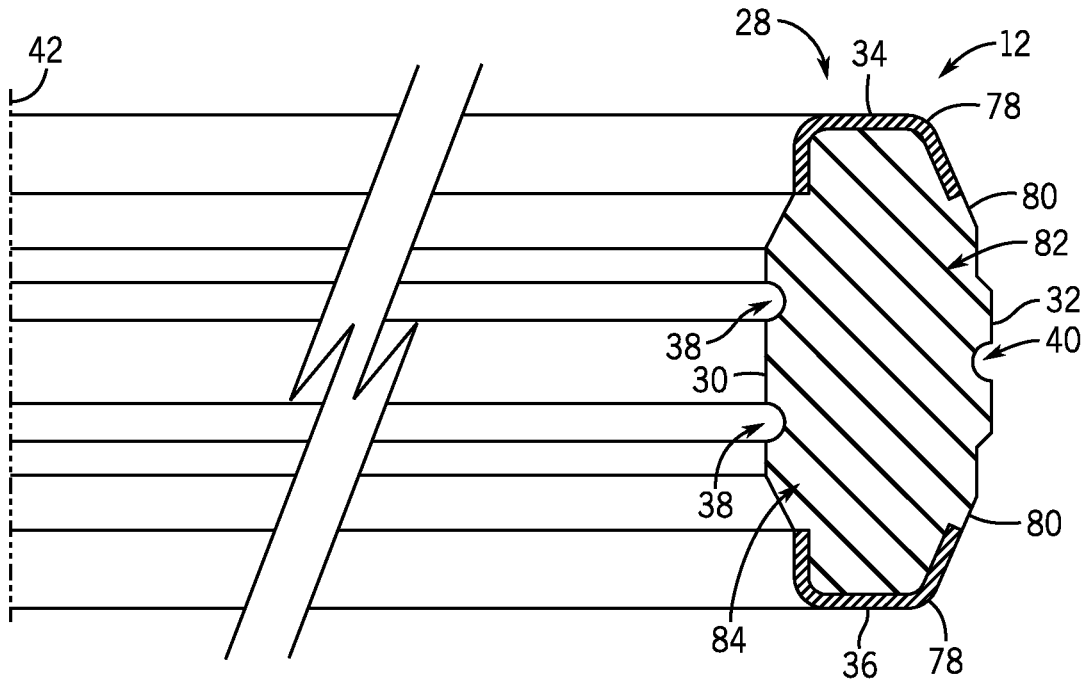
FIG. 9 is a partial cross-sectional view of a Metal-End-Cap seal with multiple inner grooves on an inner face and an outer groove on an outer face according to an embodiment.

In addition, FIG. 9 is a partial cross-section of an exemplary embodiment of a Metal-End-Cap seal 12 with multiple inner grooves 38 on its inner face 30 and an outer groove 40 on its outer face 32. The Metal-End-Cap seal 12 includes metal caps 78 disposed on the first side face 34 and second side face 36 of the Metal-End-Cap seal 12. Further, the Metal-End-Cap seal 12 includes chamfers 80 defining a first protrusion 82 including the outer face 32. The Metal-End-Cap seal 12 also includes a second protrusion 84 that defines the inner face 30. However, in certain embodiments, the Metal-End-Cap seal 12 may have the first protrusion 82 and the chamfers 80 disposed on the inner face 30 of the Metal-End-Cap seal 12 and the second protrusion 84 disposed on the outer face 32.

Figure 10:
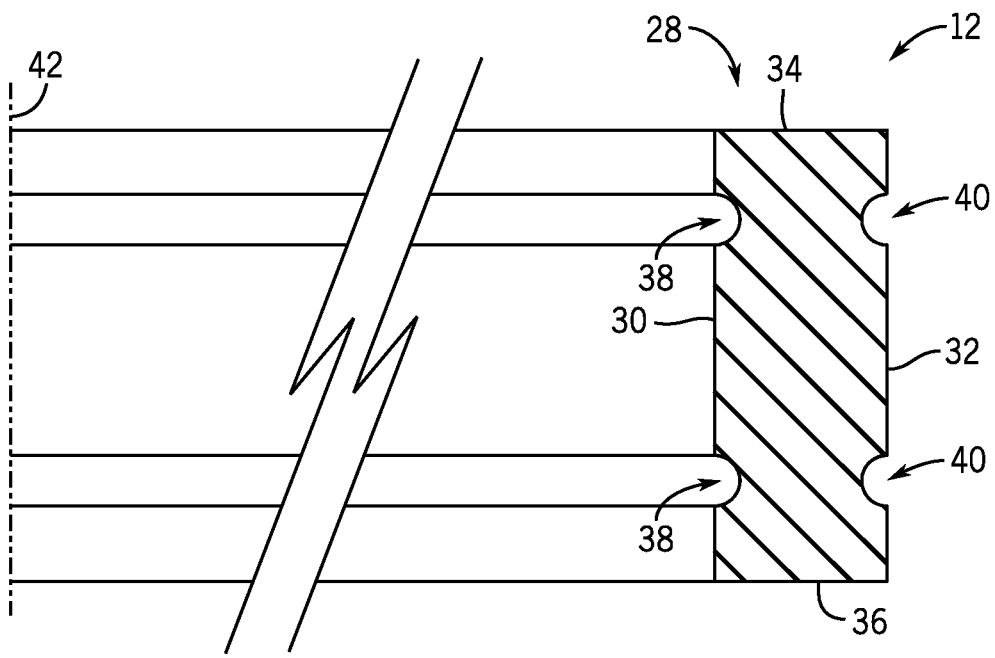
FIG. 10 is a partial cross-sectional view of a generic annular (radial) seal with multiple inner grooves on an inner face and multiple outer grooves on an outer face according to an embodiment.

In addition to the S-seal, T-seal, and Metal-End-Cap seal embodiments illustrated in FIGS. 5-9, the grooved seal 12 may also include more conventional annular (radial) configurations. For instance, FIG. 10 is a partial cross-section of an exemplary embodiment of a generic annular (radial) seal 12 with multiple inner grooves 38 on its inner face 30 and multiple outer grooves 40 on its outer face 32.

Figure 11:
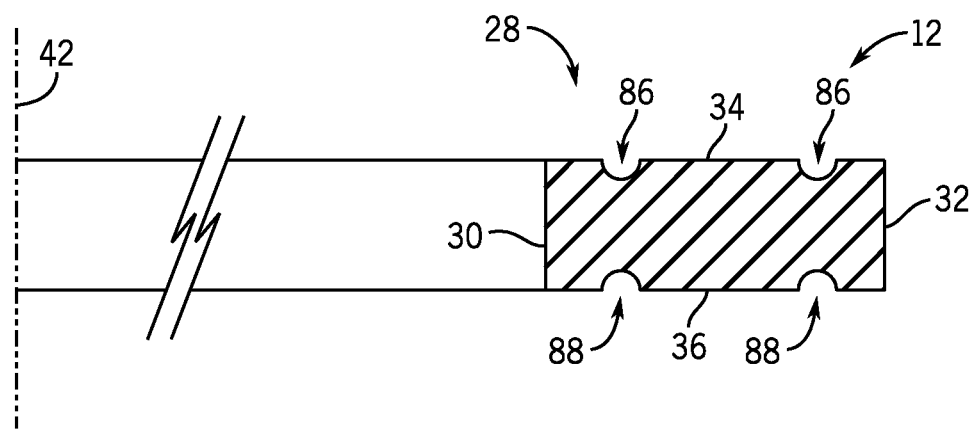
FIG. 11 is a partial cross-sectional view of a face seal with multiple top grooves on a top face and multiple bottom grooves on a bottom face according to an embodiment.

Although the embodiments described above focus primarily on annular (radial) grooved seals 12, similar techniques may be employed in the design and use of face seals. Face seals generally provide a fluid seal between two generally flat surfaces. For example, FIG. 11 is a partial cross-section of an exemplary embodiment of a face seal 12 with multiple top grooves 86 on its first side face 34 and multiple bottom grooves 88 on its second side face 36. In operation, the first side face 34 is mated to a first body and the second side face 36 is mated to a second body to provide a fluid seal between the first and second bodies. Accordingly, this embodiment includes the addition of sealing features conducive to sealing via the first side face 34 and the second side face 36. The distribution of contact stresses through the top grooves 86 and the bottom grooves 88 occurs in generally the same manner with the face seal 12 as with the inner grooves 38 and the outer grooves 40 with the annular (radial) seal embodiments described above.

Each of the above discussed embodiments of the grooved seal 12 may include any combination of elastomers and cross-sections conducive to providing a fluid seal. For example, the grooved seal 12 may include an elastomer having a different hardness, stiffness or glass transition temperature. Further, certain embodiments may include combinations of the embodied cross-sections. For example, an embodiment may include a cross-section including a profile similar to FIG. 5 on the inner face 30, and a cross-section including a profile similar to FIG. 7 on the outer face 32. In other words, the inner face 30 and the outer face 32 profiles may either be symmetrical with one another or asymmetrical with one another. In addition, the number, spacing, and configuration of grooves used on any particular face of the grooved seal 12 may be selected, for instance, based on the length of the interface between the grooved seal 12 and the bodies with which the grooved seal 12 contacts, the expected contact stresses, the expected operating conditions of the well 22, the desired pressure ratings of the grooved seal 12, the annular diameter and width of the grooved seal 12, and so forth.

Figure 12:
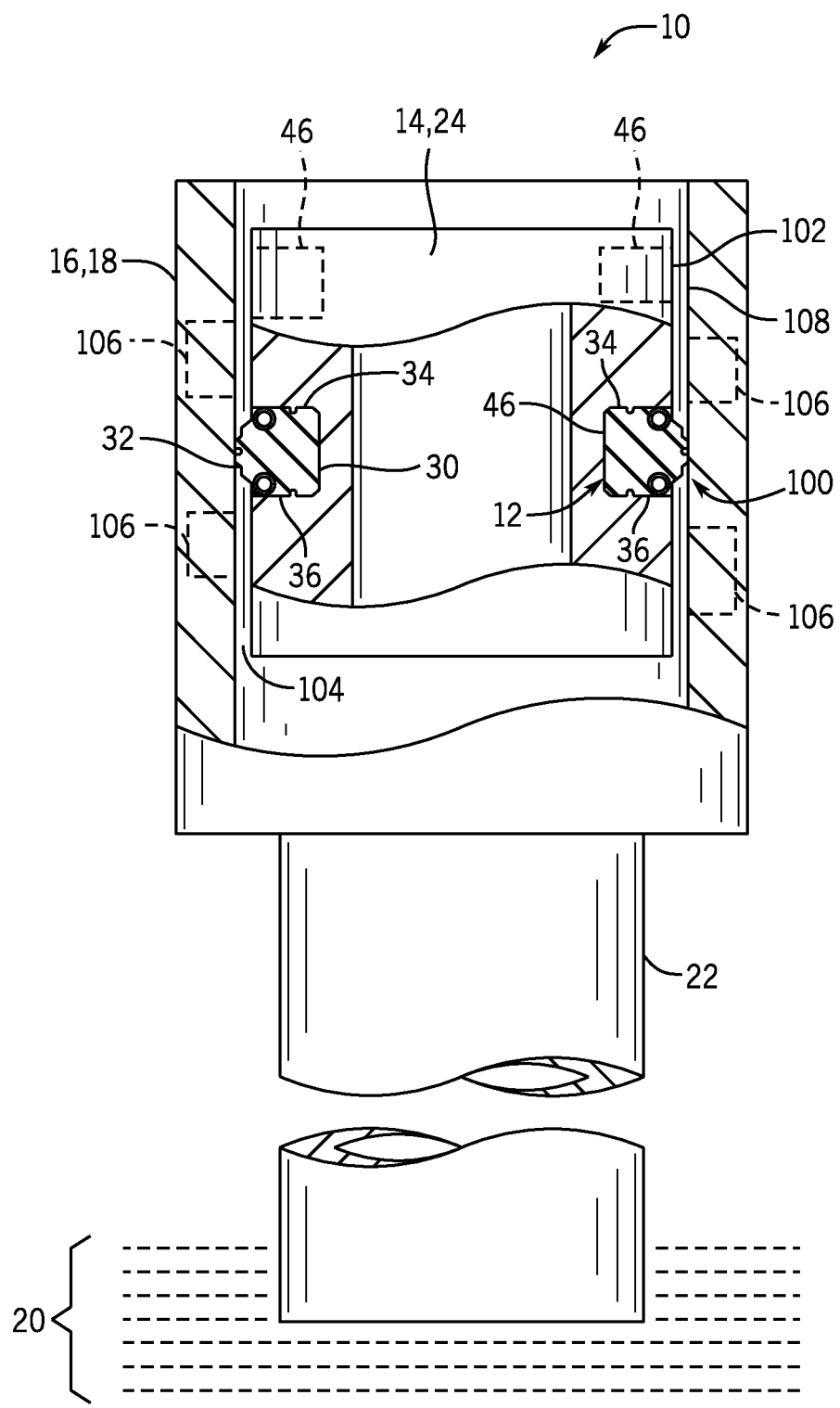
FIG. 12 is a cross-sectional view of a grooved seal in an inner body according to an embodiment.

FIG. 12 shows a cross-sectional view of a grooved seal 12 in an inner body 14 (e.g., tubing hanger) of the hydrocarbon extraction system 10. As illustrated, the inner body 14 includes the inner body recess 46 (e.g., an annular channel) formed in the outer surface 102 of the inner body 14. The grooved seal 12 rests within the inner body recess 46 and seals the annular space 104 between the inner body 14 and the outer body 16 (e.g., tubing spool). In some embodiments, the grooved seal 12 may couple to the outer body 16 instead of the inner body 14. For example, the outer body 16 may receive the grooved seal 12 in an outer body recess 106 (e.g., an annular channel) formed in the inner surface 108 of the outer body 16. In still other embodiments, the hydrocarbon extraction system 10 may include multiple grooved seals 12 in multiple inner body recesses 46 and/or multiple outer body recesses 106 to provide redundant seals 100 between the inner body 14 and the outer body 16.

Figure 13:
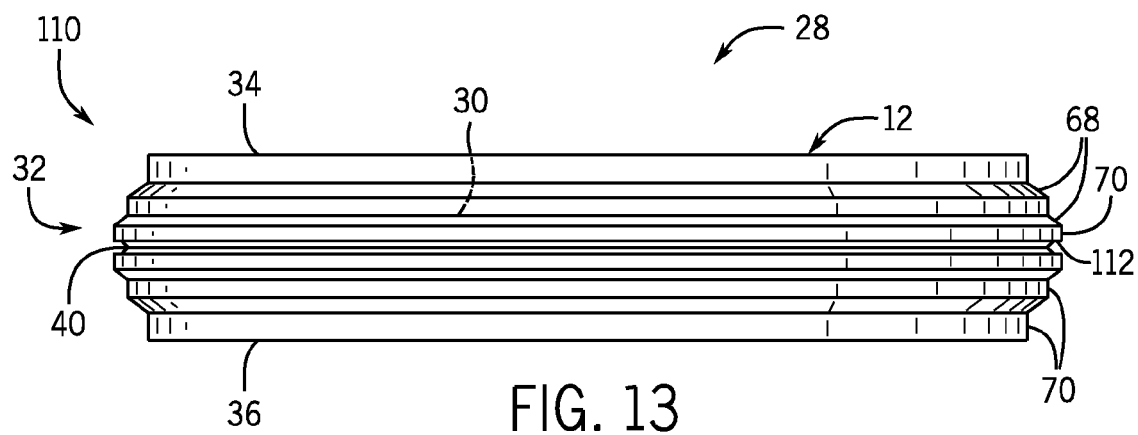
FIGS. 13 is a side view of a grooved seal according to an embodiment.

FIG. 13 is a side view side of an embodiment of the grooved seal 12 (e.g., S-seal). The grooved seal 12 includes an annular body 28 (e.g., an annular elastomeric body) with an inner face 30 (e.g., a sealing or non-sealing face), an outer face 32 (e.g., sealing face), first side face 34 (e.g., axial end face), and second side face 36 (e.g., axial end face). As illustrated, the outer face 32 includes multiple tapered lead-ins 68 (e.g., annular lead-ins) and associated lips 70 (e.g., annular lips) that form a protrusion 110 (e.g., annular protrusion). In addition, the outer face 32 may include one or more outer grooves 40 (e.g., outer annular grooves). The combination of lead-ins 68, lips 70, and grooves 40 reduces the overall contact area of the grooved seal 12, which increases the contact stress between the grooved seal 12 and the outer body 16. In particular, at location 112 (i.e., where the groove 40 contacts the outer face 32), the grooved seal 12 may experience increased contact stress that maintains the seal 100 between the grooved seal 12 and the outer body 16. As explained above, the grooves 40 do not couple with any other mechanical features of the outer bodies 16, such as mating protrusions. Instead, the groove 40 forms a cavity (e.g., annular cavity) with the outer body 16. In operation, the material of the grooved seal 12 may deform slightly into the cavity formed by the grooves 40.

Figure 14:
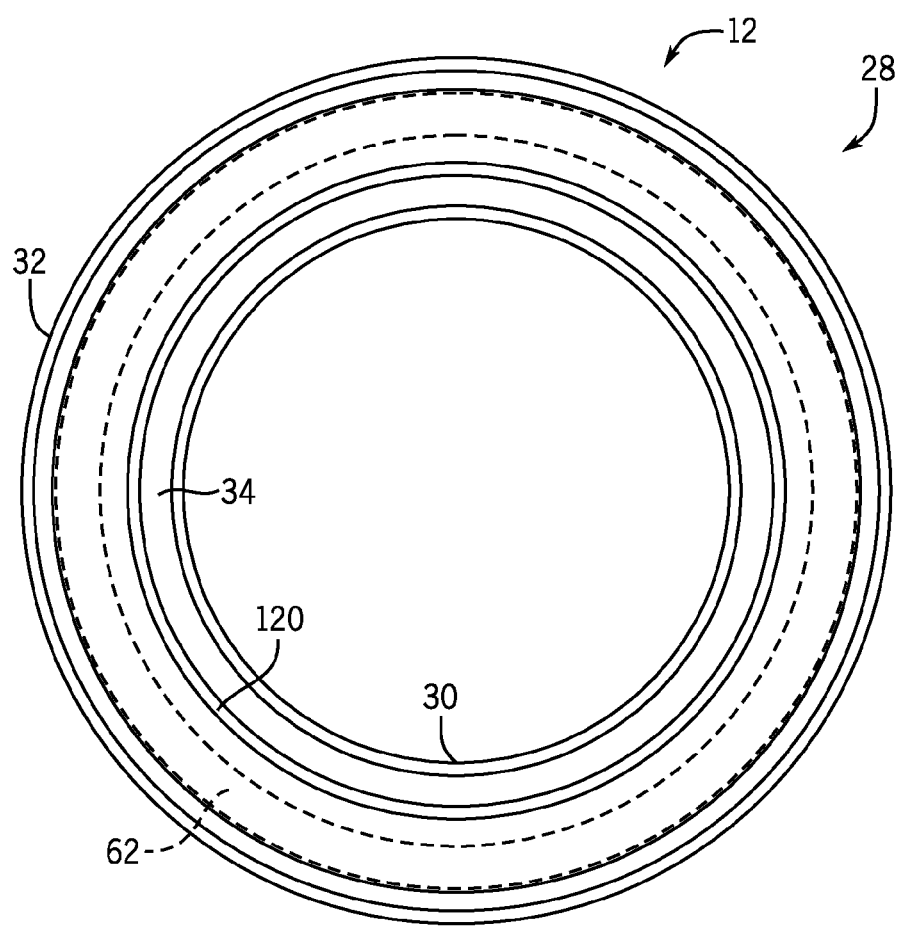
FIG. 14 is a top view of a grooved seal according to an embodiment.

FIG. 14 is a top view of a grooved seal 12. As explained above, the grooved seal 12 includes the annular body 28 with the inner face 30, the outer face 32, and first side face 34. In FIG. 14, the first side face 34 of the grooved seal 12 includes a groove 120 (e.g., annular groove) that reduces the contact area and increases the contact stress between the first side face 34 of the grooved seal 12 and the inner body recess 46 of the inner body 14. In the present embodiment, the first side face 34 includes one groove 120. However, some embodiments may include multiple grooves 120 (e.g., annular grooves) that further reduce the contact area and increase the contact stress between the first side face 34 and the inner body recess 46. The grooved seal 12 may also include anti-extrusion springs 62 (e.g., coil springs) embedded in the body of the grooved seal 12 between the first side face 34 and the second side face 36. The anti-extrusion springs 62 inhibit extrusion of the grooved seal 12 during exposure to extreme pressure and/or temperature. The anti-extrusion springs 62 may be formed of stainless steel or an alloy of nickel and chromium, such as an INCONEL alloy.

Figure 15:
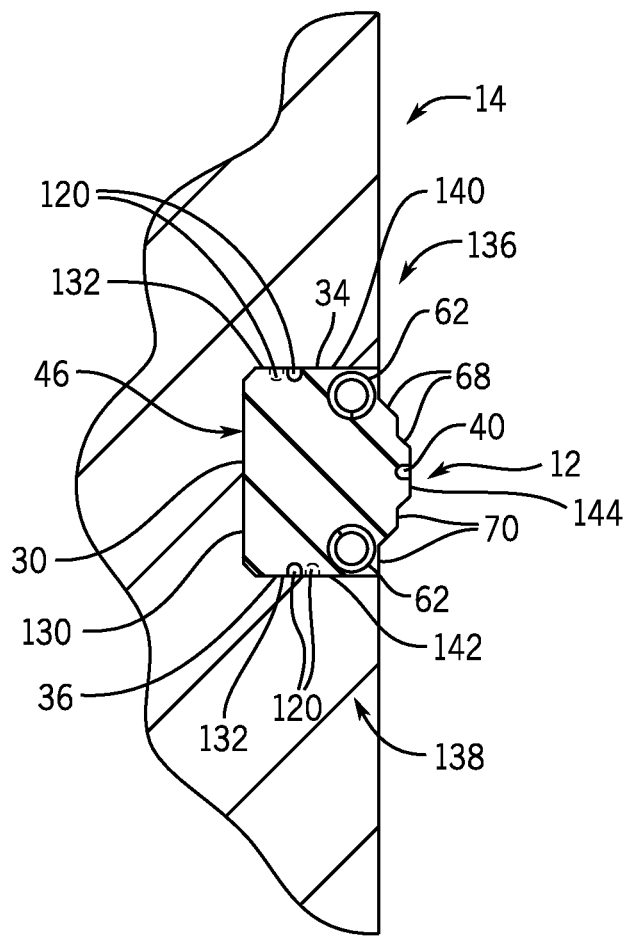
FIG. 15 is a cross-sectional view of a grooved seal within a recess of a body according to an embodiment.

FIG. 15 is a partial cross-sectional view of the grooved seal 12 within a grooveless inner body recess 46. As illustrated, the inner body 14 forms the inner body recess 46 with inner wall 130 (e.g., radially inner annular wall) and sidewalls 132 (e.g., axially opposite upper and lower annular walls). In some embodiments, one or both of the sidewalls 132 may be disposed at an acute, rather than a normal (e.g., perpendicular), angle with respect to the inner wall 130 or outer surface 102. After coupling the grooved seal 12 to the inner body 14, the inner wall 130 of the inner body recess 46 contacts the inner face 30 of the grooved seal 12, and the first and second side faces 34, 36 of the grooved seal 12 contact the sidewalls 132 of the inner body recess 46. As illustrated, the grooved seal 12 may include grooves 120 in the first and/or second side faces 34, 36. The grooves 120 reduce the contact area and increase the contact stress between the first and second side faces 34, 36 of the grooved seal 12 and the sidewalls 132 of the inner body recess 46. In other words, the first and second side faces 34, 36 become sealing faces. The ability of the first and second side faces 34, 36 to seal with the sidewalls 132 reduces manufacturing costs for devices using the grooved seal 12, by relaxing the manufacturing tolerances of the recess 46 when compared to devices using conventional S-seals.

The grooves 120 may have a semi-circular cross-sectional profile, which extends circumferentially around an axis of the grooves seal 12. As the grooved seal 12 compresses between the inner body 14 and outer body 16, the grooves 120 increase the energy (e.g., contact stress) applied to the first side face 34 and the second side face 36, between the grooves 120 and the anti-extrusion springs 62. The increase in surface energy of the first and second side faces 34, 36 form robust seals 136, 138 with the sealing surfaces 140 and 142 between grooves 120. Depending on the embodiment, the grooved seal 12 may also include multiple grooves 120 on the first side face 34 and/or the second side face 36. In some embodiments, the first side face 34 may have the same depth, size, position, and/or number of grooves 120 as the second side face 36 (i.e., mirror image). In other embodiments, the first side face 34 and second side face 36 may differ in number, depth, size, and/or position of grooves 120.

As explained above, the outer face 32 of the grooved seal 12 includes multiple tapered lead-ins 68 and lips 70 that form a protrusion 110. In some embodiments, the protrusion 110 may include an outer groove 40 that increases the energy (e.g., contact stress) applied to the sealing surface 144 when the grooved seal 12 is compressed. The increase in contact stress strengthens the seal 100 between the outer face 32 of the grooved seal 12 and the inner surface 108 of the outer body 16. In some embodiments, the inner face 30 is a non-sealing face, wherein the inner face 30 does not or is not intended to form a seal with the inner wall 130. In other words, in some embodiments, the inner face 30 may lack grooves, such as those in the outer face 32, first side face 34, and second side face 36. However, some embodiments the inner face 30 may include one or more annular grooves.

Figure 16:
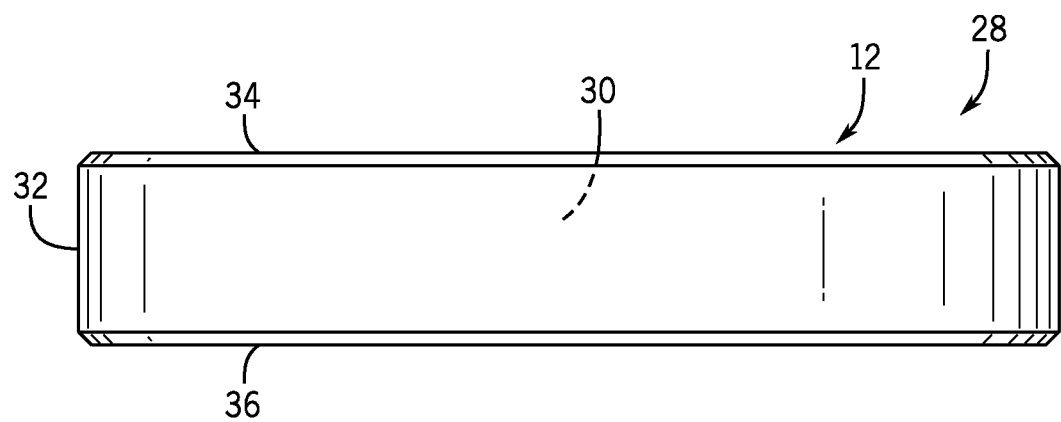
FIG. 16 is a side view of a grooved seal according to an embodiment.

FIG. 16 is a side view of a grooved seal 12 that couples to the outer body recess 106. The grooved seal 12 includes an annular body 28 that has an inner face 30 (e.g., sealing face), outer face 32 (e.g., sealing or non-sealing face), first side face 34, and second side face 36. However, unlike the grooved seal 12 in FIG. 13 that includes a protrusion 110 on the outer face 32, the grooved seal of FIG. 16 has a substantially flat outer face 32 that rests within the outer body recess 106 of the outer body 16.

Figure 17:
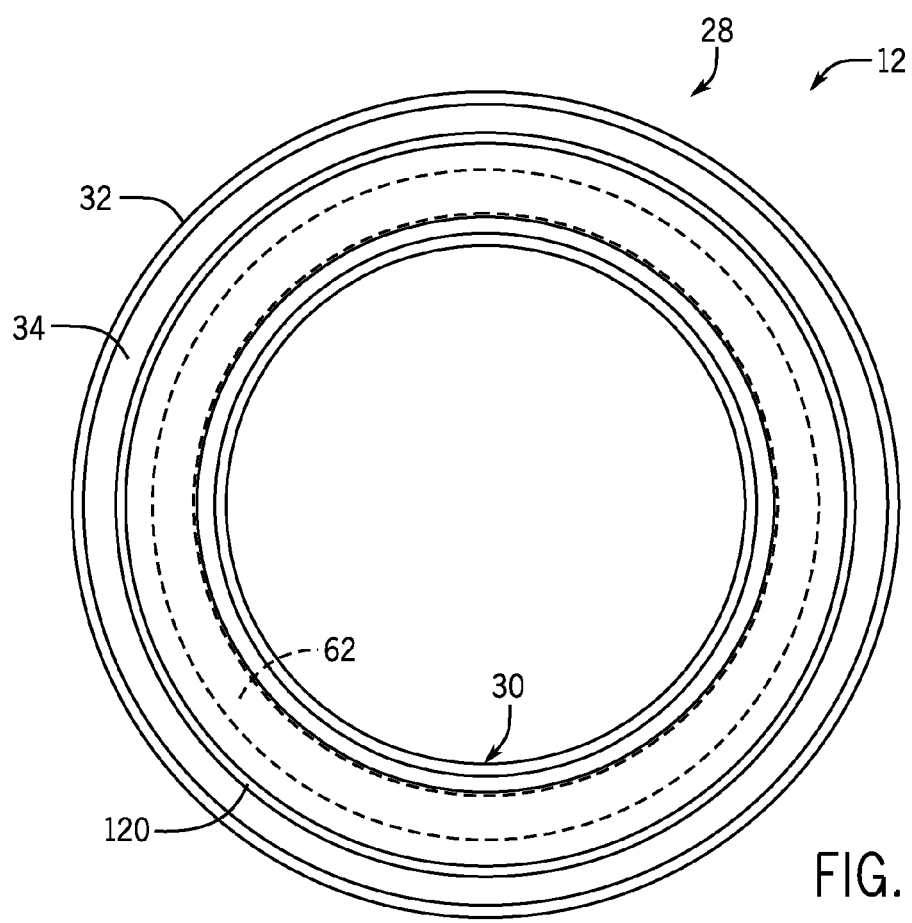
FIG. 17 is a top view of a grooved seal according to an embodiment.

FIG. 17 is a top view of the grooved seal 12. As explained above, the grooved seal 12 includes the annular body 28 with the inner face 30, the outer face 32, and first side face 34. As illustrated, the first side face 34 of the grooved seal 12 includes a groove 120 that reduces the contact area and increases the contact stress between the first side face 34 of the grooved seal 12 and the inner body recess 46 of the inner body 14, which maintains the seal 100. In the present embodiment, the first side face 34 includes one groove 120. However, some embodiments may include multiple grooves 120 that further reduce the contact area and increase the contact stress between the first side face 34 and the inner body recess 46. The dashed lines 62 illustrate the location of anti-extrusion springs 62 embedded in the annular body 28 of the grooved seal 12. As illustrated, the anti-extrusion springs 62 are imbedded in the grooved seal between the inner face 30 and the first side face 34; and the inner face 30 and the second side face 36. In operation, the anti-extrusion springs 62 inhibit extrusion of the elastomer when the grooved seal 12 is exposed to extreme pressure and/or temperature. The anti-extrusion springs 62 may be formed of stainless steel or an alloy of nickel and chromium, such as an INCONEL alloy.

Figure 18:
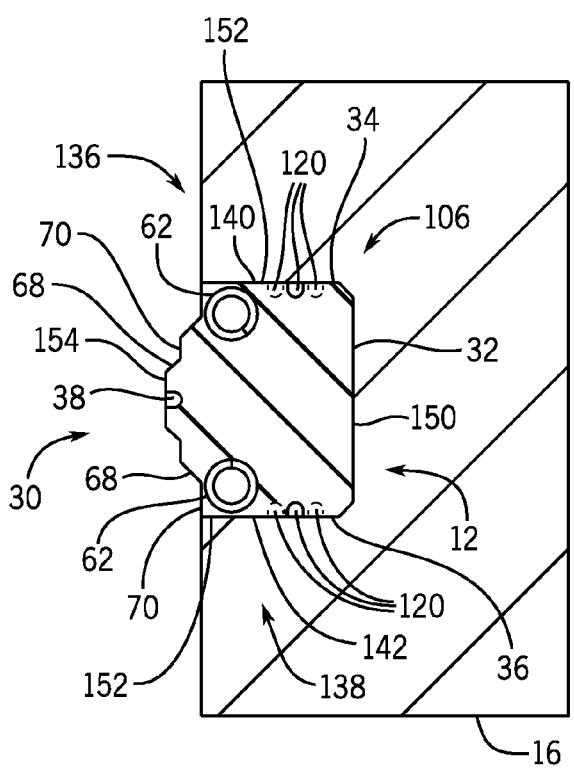
FIG. 18 is a cross-sectional view of a grooved seal within a recess of a body according to an embodiment.

FIG. 18 is a partial cross-sectional view of the grooved seal 12 within the grooveless annular outer body recess 106 (i.e., the outer body recess 106 does not have grooves in the surfaces surrounding the outer body recess 106). As illustrated, the outer body 16 forms the outer body recess 106 with inner wall 150 (e.g., radially inner annular wall) and sidewalls 152 (e.g., axially opposite upper and lower annular walls). In some embodiments, one or both of the sidewalls 152 may be disposed at an acute, rather than a normal (e.g., perpendicular), angle with respect to the inner wall 150 or outer surface 102. After coupling the grooved seal 12 to the outer body 16, the inner wall 150 of the outer body recess 106 contacts the outer face 32 of the grooved seal 12, and the first and second side faces 34, 36 of the grooved seal 12 contact the sidewalls 152 of the outer body recess 106. As illustrated, the grooved seal 12 may include grooves 120 in the first and/or second side faces 34, 36. The grooves 120 reduce the contact area and increase the contact stress between the first and second side faces 34, 36 of the grooved seal 12 and the sidewalls 152 of the outer body recess 106. In other words, the first and second side faces 34, 36 become sealing faces. The ability of the first and second side faces 34, 36 to seal with the sidewalls 152 reduces manufacturing costs for devices using the grooved seal 12, by relaxing the manufacturing tolerances of the recess 106 when compared to devices using conventional S-seals.

The grooves 120 may have a semi-circular cross-sectional profile, which extends circumferentially around an axis of the grooved seal 12, and as the grooved seal 12 compresses between the outer body 16 and outer body 16, the grooves 120 increase the energy (e.g., contact stress) applied to the first side face 34 and the second side face 36, between the grooves 120 and the anti-extrusion springs 62. The increase in surface energy of the first and second side faces 34, 36 form robust seals 136, 138 with the sealing surfaces 140 and 142 between grooves 120 and the anti-extrusion springs 62. In some embodiments, the position of the grooves 120 enable the first side face 34 and the second side face 36 to seal with the sidewalls 152. Depending on the embodiment, the grooved seal 12 may also include multiple grooves 120 on the first side face 34 and/or the second side face 36. In some embodiments, the first side face 34 may have the same depth, size, position, and/or number of grooves 120 as the second side face 36 (i.e., mirror image). In other embodiments, the first side face 34 and second side face 36 may differ in number, depth, size, and/or position of grooves 120.

As illustrated, the inner face 30 of the grooved seal 12 includes multiple tapered lead-ins 68 and lips 70 that form a protrusion 110. In some embodiments, the protrusion 110 may include an inner groove 38 that increases the energy (i.e., contact stress) applied to the sealing surface 154 when the grooved seal 12 is compressed. The increase in energy strengthens the seal 100 between the inner face 30 of the grooved seal 12 and the outer surface 102 of the inner body 14. In some embodiments, the outer face 32 is a non-sealing face, wherein the outer face 32 does not or is not intended to form a seal with the inner wall 150. In other words, in some embodiments, the outer face 32 may lack grooves, such as inner groove 38 and grooves 120 included in respective inner face 30, first side face 34, and second side face 36. However, some embodiments the outer face 32 may include one or more annular grooves.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
an inner body;
an outer body disposed about the inner body; and
a grooved seal, wherein the grooved seal comprises a sealing face and first and second side faces, wherein the first side face comprises a first groove, the second side face comprises a second groove, and the sealing face comprises a third groove;
wherein one of the inner body or the outer body comprises an annular channel, and the grooved seal is disposed in the annular channel to seal an annular space between the inner body and outer body;
wherein the sealing face seals against one of the inner body or the outer body, the first side face having the first groove seals against a first sidewall of the annular channel, and the second side face having the second groove seals against a second sidewall of the annular channel; and
wherein the first groove is configured to increase contact stress against the first sidewall, the second groove is configured to increase contact stress against the second sidewall, and the third groove is configured to increase contact stress against the one of the inner body or the outer body.

2. The system of claim 1, wherein the grooved seal comprises a non-sealing face opposite the sealing face.

3. The system of claim 1, wherein the annular channel is in the outer body.

4. The system of claim 1, wherein the annular channel is in the inner body.

5. The system of claim 1, wherein the inner body comprises a tubing hanger and the outer body comprises a tubing spool.

6. The system of claim 1, wherein the system comprises a hydrocarbon extraction system.

7. The system of claim 1, wherein the grooved seal comprises at least one spring.

8. The system of claim 1, wherein a first inner surface of the first groove is substantially perpendicular to the first side wall.

9. The system of claim 8, wherein a second inner surface of the second groove is substantially perpendicular to the second sidewall.

10. The system of claim 9, wherein a third inner surface of the third groove is substantially perpendicular to a surface of the one of the inner body or the outer body.

11. The system of claim 1, wherein the sealing face comprises a projection that projects from a central portion of the sealing face.

12. A system, comprising:
a grooved seal, comprising:
a first annular face;
a second annular face opposite the first annular face;
a first annular side face and a second annular side face extending between the first annular face and the second annular face;
a first spring embedded in the grooved seal at a first intersection portion of the first annular side face and first annular face;
a second spring embedded in the grooved seal at a second intersection portion of the second annular side face and the first annular face;
wherein the first annular side face comprises a first groove disposed between the first spring and a third intersection portion of the second annular face and the first annular side face, the second annular side face comprises a second groove disposed between the second spring and a fourth intersection portion of the second annular face and the second annular side face, and the first annular face comprises a third groove.

13. The system of claim 12, wherein the first annular face comprises a projection that projects from a central portion of the first annular face.

14. The system of claim 12, wherein the first annular side face and the second annular side face comprise respective first and second sealing surfaces, the seal face comprises a third sealing surface.

15. The system of claim 14, wherein the first, second, and third grooves are configured to increase a contact stress along the respective first, second, and third sealing surfaces.

16. The system of claim 12, wherein a body of the grooved seal is made of an elastomer comprising nitrile, hydrogenated nitrile butadiene rubber, polyether ether ketone, thermoplastic, fluroelastomer, perfluroelastomer, or perflurosilicon, or any combination thereof.

17. The system of claim 12, wherein the first and second springs each comprise one of a nickel-chromium alloy and stainless steel.

18. The system of claim 12, wherein the grooved seal in configured to couple to a recess in a body, and wherein the recess is grooveless.

19. The system of claim 12, wherein the first, second, and third grooves each comprise a semi-circular cross-sectional profile extending circumferentially about an axis of the grooved seal.

20. A grooved seal, comprising:
an elastomeric body;
first and second metal springs embedded in respective first and second corner portions of the elastomeric body;
a seal face extending between the first and second corner portions having the first and second springs;
a face opposite the seal face; and
first and second side faces extending between the seal face and the face;
wherein the first side face is configured to seal the first sidewall of a recess, and the second side face is configured to seal the second sidewall of the recess;
wherein the first side face comprises a first groove, the second side face comprises a second groove, and the seal face comprises a third groove.

21. The grooved seal of claim 20, wherein the first, second, and third grooves each comprise a semi-circular cross-sectional profile extending circumferentially about an axis of the grooved seal.

22. The grooved seal of claim 21, wherein the first, second, and third grooves are configured to increase a contact stress.

23. The grooved seal of claim 20, wherein the face does not have grooves.

24. The grooved seal of claim 20, wherein the first and second side faces are axially opposite from one another, and the sealing face is an annular sealing face disposed axially between the first and second side faces.

25. A system, comprising:
an inner body;
an outer body disposed about the inner body, wherein the inner body comprises a tubing hanger and the outer body comprises a tubing spool; and
a grooved seal, wherein the grooved seal comprises a sealing face and first and second side faces, wherein the first side face comprises a first groove, the second side face comprises a second groove, and the sealing face comprises a third groove;
wherein one of the inner body or the outer body comprises an annular channel, and the grooved seal is disposed in the annular channel to seal an annular space between the inner body and outer body;
wherein the sealing face seals against one of the inner body or the outer body, the first side face having the first groove seals against a first sidewall of the annular channel, and the second side face having the second groove seals against a second sidewall of the annular channel.

26. A system, comprising:
an inner body;
an outer body disposed about the inner body; and
a grooved seal, wherein the grooved seal comprises a sealing face and first and second side faces, wherein the first side face comprises a first groove, the second side face comprises a second groove, and the sealing face comprises a third groove;
wherein one of the inner body or the outer body comprises an annular channel, and the grooved seal is disposed in the annular channel to seal an annular space between the inner body and outer body;
wherein the sealing face seals against one of the inner body or the outer body, the first side face having the first groove seals against a first sidewall of the annular channel, and the second side face having the second groove seals against a second sidewall of the annular channel; and
wherein a first inner surface of the first groove is substantially perpendicular to the first side wall.

27. A system, comprising:
an inner body;
an outer body disposed about the inner body; and
a grooved seal, wherein the grooved seal comprises a sealing face and first and second side faces, wherein the first side face comprises a first groove, the second side face comprises a second groove, and the sealing face comprises a third groove and projection that projects from a central portion of the sealing face;
wherein one of the inner body or the outer body comprises an annular channel, and the grooved seal is disposed in the annular channel to seal an annular space between the inner body and outer body;
wherein the sealing face seals against one of the inner body or the outer body, the first side face having the first groove seals against a first sidewall of the annular channel, and the second side face having the second groove seals against a second sidewall of the annular channel.

* * * * *